(12) United States Patent
Kim et al.

(10) Patent No.: US 10,443,741 B2
(45) Date of Patent: Oct. 15, 2019

(54) BLADE FOR VACUUM VALVE

(71) Applicant: PRESYS. CO., LTD, Suwon-si (KR)

(72) Inventors: Bae-Jin Kim, Suwon-si (KR); Ki Sun Choi, Hwaseong-si (KR); Sang Min Kim, Suwon-si (KR); Kang Hyun Kim, Hwaseong-si (KR)

(73) Assignee: PRESYS. CO., LTD, Suwon (KR)

( * ) Notice: Subject to any disclaimer, the term of this patent is extended or adjusted under 35 U.S.C. 154(b) by 8 days.

(21) Appl. No.: 15/571,735

(22) PCT Filed: Apr. 14, 2016

(86) PCT No.: PCT/KR2016/003884
§ 371 (c)(1),
(2) Date: Nov. 25, 2017

(87) PCT Pub. No.: WO2016/178481
PCT Pub. Date: Nov. 10, 2016

(65) Prior Publication Data
US 2018/0156339 A1 Jun. 7, 2018

(30) Foreign Application Priority Data

May 4, 2015 (KR) .......................... 10-2015-0062475

(51) Int. Cl.
*F16K 3/18* (2006.01)
*F16K 3/02* (2006.01)
(Continued)

(52) U.S. Cl.
CPC .................. *F16K 3/18* (2013.01); *F16K 3/02* (2013.01); *F16K 3/16* (2013.01); *F16K 31/122* (2013.01); *F16K 51/02* (2013.01)

(58) Field of Classification Search
CPC ..... F16K 3/18; F16K 3/02; F16K 3/16; F16K 51/02; F16K 31/122
(Continued)

(56) References Cited

U.S. PATENT DOCUMENTS 5,579,718 A * 12/1996 Freerks .................... F16K 51/02
118/733
7,959,130 B2 * 6/2011 Duelli ...................... F16K 51/02
251/326

(Continued)

FOREIGN PATENT DOCUMENTS

JP 2000028013 A 1/2000
KR 100596332 B1 7/2006
(Continued)

*Primary Examiner* — Craig J Price
*Assistant Examiner* — Andrew J Rost
(74) *Attorney, Agent, or Firm* — Patentfile, LLC; Bradley C. Fach; Steven R. Kick

(57) ABSTRACT

A blade for vacuum valves is provided with an opening/closing plate having one side surface coming into contact with a moving passage part. A screw coupling part is formed on the other side surface and a first elastic member seating part is formed on the outer circumference of the screw coupling part. A shaft connecting bar is provided on the other surface of the opening/closing plate having a contact protrusion part having a second elastic member seating part and a connecting part formed in the contact protrusion part so that a connecting unit is inserted. The first elastic member is provided between the first elastic member seating part and the second elastic member seating part to guide the elastic connection between the opening/closing plate and the shaft connecting bar.

3 Claims, 6 Drawing Sheets

(51) Int. Cl.
*F16K 3/16* (2006.01)
*F16K 31/122* (2006.01)
*F16K 51/02* (2006.01)

(58) Field of Classification Search
USPC .................................. 251/326, 329, 84, 85
See application file for complete search history.

(56) References Cited

U.S. PATENT DOCUMENTS

| | | | | |
|---|---|---|---|---|
| 8,678,344 | B2 * | 3/2014 | Ehrne | F16K 3/314 |
| | | | | 251/193 |
| 8,807,527 | B2 * | 8/2014 | Kim | H01L 21/67126 |
| | | | | 137/553 |
| 8,827,241 | B2 * | 9/2014 | Geiser | F16K 51/02 |
| | | | | 251/193 |
| 2002/0139954 | A1 * | 10/2002 | Ito | F16K 3/10 |
| | | | | 251/326 |
| 2007/0272888 | A1 | 11/2007 | Tichy | |
| 2016/0363240 | A1 * | 12/2016 | Wagner | F16K 51/02 |

FOREIGN PATENT DOCUMENTS

| | | |
|---|---|---|
| KR | 100994761 B1 | 11/2010 |
| KR | 101407656 B1 | 6/2014 |

* cited by examiner (a)

(b)

BLADE FOR VACUUM VALVE

This Application is a 35 U.S.C. 371 National Stage Entry of International Application No. PCT/KR2016/003884 on Apr. 14, 2016, which claims the benefit of Republic of Korea Patent Application No. 10-2015-0062475, filed on May 4, 2015, the entire disclosures of which are incorporated by reference herein.

TECHNICAL FIELD

The present invention relates to a blade for vacuum valves, and more particularly, to a blade 1 for a vacuum valve provided in a moving space 11 inside a valve housing 10 and opening/closing a moving passage part 12 depending on whether to operate a driving member 30, the blade 1 for a vacuum valve including: an opening/closing plate 100 formed in a plate shape and having one side surface to be in contact with the moving passage part 12 and the other side surface on which screw coupling parts 110 and 110' are formed, wherein first elastic member seating parts 120 and 120' are provided on the outer circumference of the screw coupling parts 110 and 110' so as to allow the one side surface of first elastic members 300 and 300' to be seated thereon; at least one shaft connecting bar provided on the other side surface of the opening/closing plate, and having contact protrusion parts 210 and 210' having second elastic member seating parts 211 and 211' formed to allow the other side surface of the first elastic member 300 and 300' to be seated thereon, and connecting parts 220 and 220' formed in the contact protrusion parts 210 and 210' so that connecting units 400 and 400' are inserted therein, wherein the first elastic member 300 and 300' provided between the first elastic member seating parts 120 and 120' and the second elastic member seating parts 211 and 211' so as to guide the elastic connection between the opening/closing plate 100 and the shaft connecting bar 200, and the connecting units 400 and 400' are respectively inserted into the connecting parts 220 and 220' so as to be connected to the other side surface of the opening/closing plate 100.

BACKGROUND ART

In general, semiconductor manufacturing processes require high precision, and thus, high cleanliness and special production technology have been demanded.

For this reason, semiconductor devices are manufactured in a state in which foreign substances contained in the air are completely prevented from contacting the devices, that is, in a vacuum state.

Thus, a technique for sealing a vacuum work area in a semiconductor manufacturing apparatus from the air also has substantial influence on the quality of semiconductor products.

For such a semiconductor manufacturing process, a process chamber in which an integration process of a semiconductor device is performed, a vacuum pump which suctions the air in the process chamber, and a vacuum valve, which is installed between the process chamber and the vacuum pump and adjusts the transfer of the suction force of the vacuum pump, are installed.

In the configuration of such a vacuum valve, the blade, which is connected to a driving member and opens/closes a moving passage using the driving force of the driving member, functions to open/close the moving passage by being vertically or horizontally moved depending on whether to operate the driving member. Thus, the blade plays a very important role to improve work efficiency by maintaining the cleanliness inside the process chamber.

Therefore, when the moving passage is closed, the blade is preferably designed to have a high sealing performance with respect to the moving passage.

Among documents related to such blades, patent document 1 titled "installation of valve plate on valve rod" disclosed in Korean Patent Application Laid-open Publication No. 10-2011-0102328 discloses an installation of a valve plate on a valve rod using a cross member extending across the valve rod. The cross member is connected to the valve rod at a central connection point and is connected to the valve plate at two or more side connection points located on both sides of the central connection point. When installing the valve plate on the valve rod such that there is a gap between the cross member and the valve plate in a central section including cross member sections which are folded at the central connection point at the central connection point and both the sides, the valve plate is configured to be rotatable around a rotation axis perpendicular to the valve rod relative to the valve rod by using a torsion of the cross member. Thus, there was a merit in that when the valve plate closed a valve opening portion, the valve plate pressed the valve opening part with a uniform force and a tight sealing state could thereby be maintained.

However, the above-mentioned "installation of valve plate on valve rod" disclosed in patent document 1 had a problem in that as the valve rod worn and the connections of the valve plate, a vertical axis, and the like were loosened due to repetitive operation, the valve plate, when closing the valve opening, could not precisely close the valve opening part, and thus, the cleanliness inside a process chamber was decreased, foreign substances or the like penetrated into a valve housing, and particles were thereby generated.

In addition, the above-mentioned "installation of valve plate on valve rod" disclosed in patent document 1 had a structure including the valve opening part and the valve plate in which a surface-to-surface contact was made, and thus had a problem in that the valve plate, which horizontally moved to open/close the valve opening, did not moves horizontally but obliquely due to a minute change in an amount of compressed air actuating the cylinder, a piston raising output, a torque applied to the valve plate, and a connection points of components, or the like, so that a separation phenomenon occurred in a surface at which the valve plate and the valve opening met, and accordingly, sealing performance was decreased and the function as a valve used inside a process chamber was lost.

DISCLOSURE OF THE INVENTION

Technical Problem

The present invention addresses the above-mentioned limitations and the purpose of the present invention is to provide a blade for vacuum valves which is capable of maintaining a tight sealing state in such a manner that an opening/closing plate precisely comes into close contact with a moving passage part when the opening/close plate closes the moving passage part, wherein: first elastic members made of an elastic material are inserted between the opening/closing plate and a shaft connecting bar, thereby implementing a structure in which the opening/closing plate and the shaft connecting bar are elastically connected; and when a positional change of the opening/closing plate occurs due to a mechanical separation error or force unbalance, the first elastic members variably respond thereto.

Technical Solution

To solve the above-mentioned limitations, in accordance with an embodiment of the present invention, a blade for vacuum valves (1), which is provided in a moving space (11) in a valve housing (10) and opens/closes a moving passage part (12) depending on whether to operate a driving member (30), includes: an opening/closing plate (100) formed in a plate shape and having one side surface contacting the moving passage part (12) and the other side surface on which screw coupling parts (110, 110') are formed, wherein first elastic member seating parts (120, 120') provided around the screw coupling parts (110, 110') so as to allow the one sides of first elastic members (300, 300') to be seated thereon; a shaft connecting bar (200) provided on the other side surface of the opening/closing plate (100), and having one or more contact protrusion parts (210, 210') having second elastic member seating parts (211, 211') provided to allow the other sides of the first elastic members (300, 300') to be seated thereon; and connecting units (400, 400') coupled to the shaft connecting unit (200) and connected to the other surface of the opening and closing plate (100), wherein the first elastic members (300, 300') are respectively provided between the first elastic member seating parts (120, 120') and the second elastic member seating parts (211, 211') and guides the opening/closing plate (100) and the shaft connecting bar (200) to be elastically connected, and the connecting units (400, 400") are inserted into the connecting parts (220, 220') and connected to the other surface of the opening/closing plate (100).

In addition, the connecting units (400, 400') may be provided with: head parts (410, 410') having shapes of screw heads; connecting protrusion parts (420, 420') provided on one sides of the head parts (410, 410') and connected to the other surface of the opening/closing late (100); and coupling parts (430, 430') provided inside the head parts (410, 410') and the connecting protrusion parts (420, 420') so that coupling bolts (440, 440') may be inserted thereinto, the coupling bolts (440, 440') being coupled to the screw coupling parts (110, 110') while being inserted into the coupling parts (430, 430') and thereby connecting the opening/closing plate (100) and the shaft connecting bar (200).

stepped parts (221, 221') may be provided on an inner side surfaces of the coupling parts (220, 220') so that the head parts (410, 410') may be supported thereby while the coupling units (400, 400') are inserted into the connecting parts (220, 220'), and connection inserting holes (222, 222') may be provided inside the stepped parts (221, 221') so that the connecting protrusion parts (420, 420') may be inserted thereinto.

In addition, a diameter D1 of the connection inserting holes (222, 222') may be provided greater than a diameter d1 of the connecting protrusion parts (420, 420').

In addition, the stepped parts (221, 221') may be provided with third elastic member seating parts (221a, 221a') so that one sides of the second elastic members (500, 500') may be seated thereon, and second elastic members (500, 500') may be provided between the third elastic member seating parts (221a, 221a') and one sides of the head parts (410, 410') so that the shaft connecting bar (200) and the connecting units (400, 400') may be elastically connected.

Advantageous Effects

As described so far, the present invention has a merit of being capable of maintaining a tight sealing state such that: first elastic members made of an elastic material are inserted between the opening/closing plate and a shaft connecting bar, thereby implementing a structure in which the opening/closing plate and the shaft connecting bar are elastically connected; and when a positional change of the opening/closing plate occurs due to a mechanical clearance error or force unbalance, the first elastic members variably respond thereto and the opening/closing plate precisely comes into close contact with a moving passage part.

MODE FOR CARRYING OUT THE INVENTION

Figure 1:
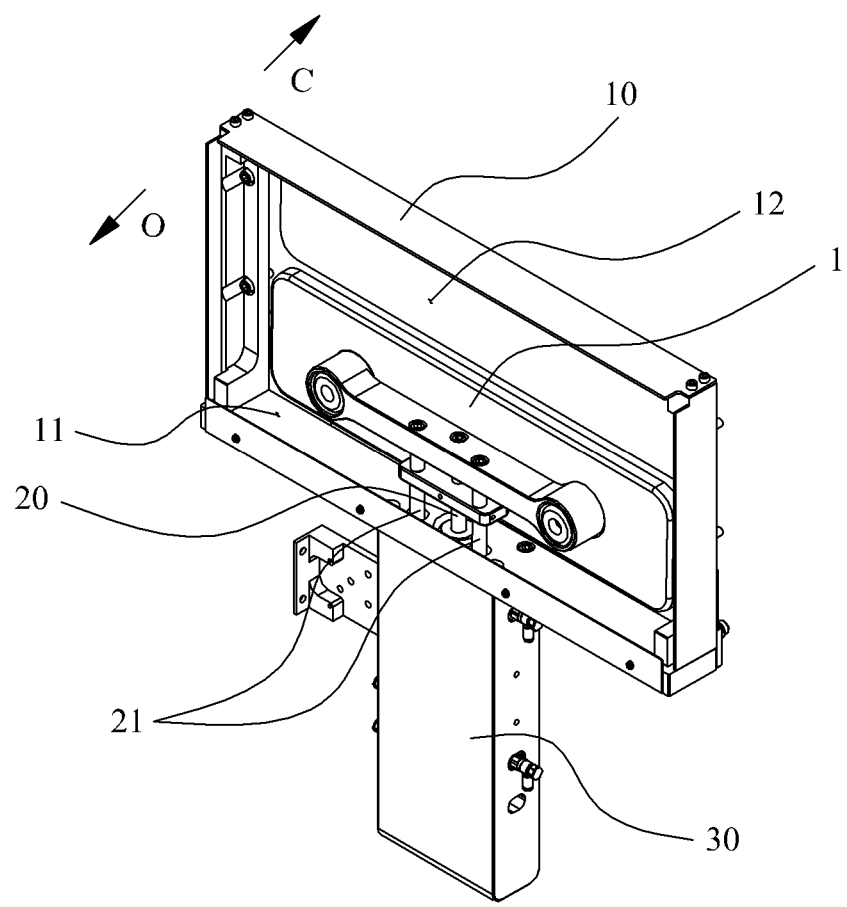
FIG. 1 is a perspective view illustrating an overall configuration of a vacuum valve including a blade for a vacuum valve in accordance with a preferred exemplary embodiment of the present invention.

Hereinafter with reference to accompanying drawings, a blade 1 for a vacuum valve in accordance with an exemplary embodiment of the present invention will be described in detail. First, it should be noted that in the drawings, like components or parts are represented by like reference numerals, if possible. In describing the present invention, when a detailed description about a related well-known art may obscure the gist of the present invention, the detailed description thereon will not be provided.

A blade 1 for a vacuum valve in accordance with an exemplary embodiment of the present invention includes: an opening/closing plate 100, a shaft connecting bar 200, and connecting units 400 and 400'.

Figure 2:
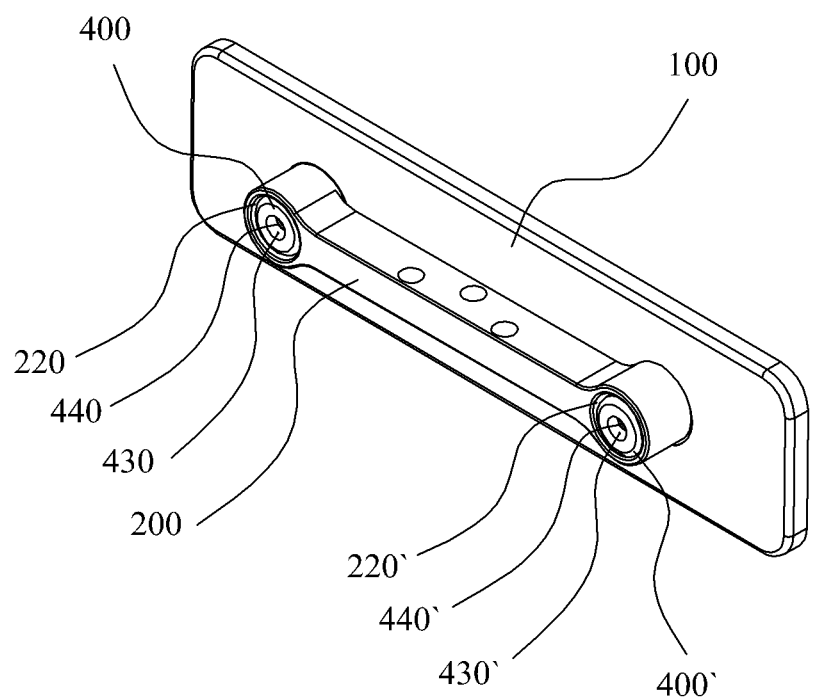
FIG. 2 is a perspective view illustrating an overall configuration of a blade for a vacuum valve in accordance with a preferred exemplary embodiment of the present invention.

First, the opening/closing plate 100 will be described. As illustrated in FIG. 1 or 2, the opening/closing plate 100 is the component, which is provided in a moving space 11 inside a valve housing 10 and opens/closes a moving passage part 12 by being moved in the closing direction C depending on whether to drive a driving member 20, and includes screw coupling parts 110 and 110' and first elastic member seating parts 120 and 120'.

Figure 3:
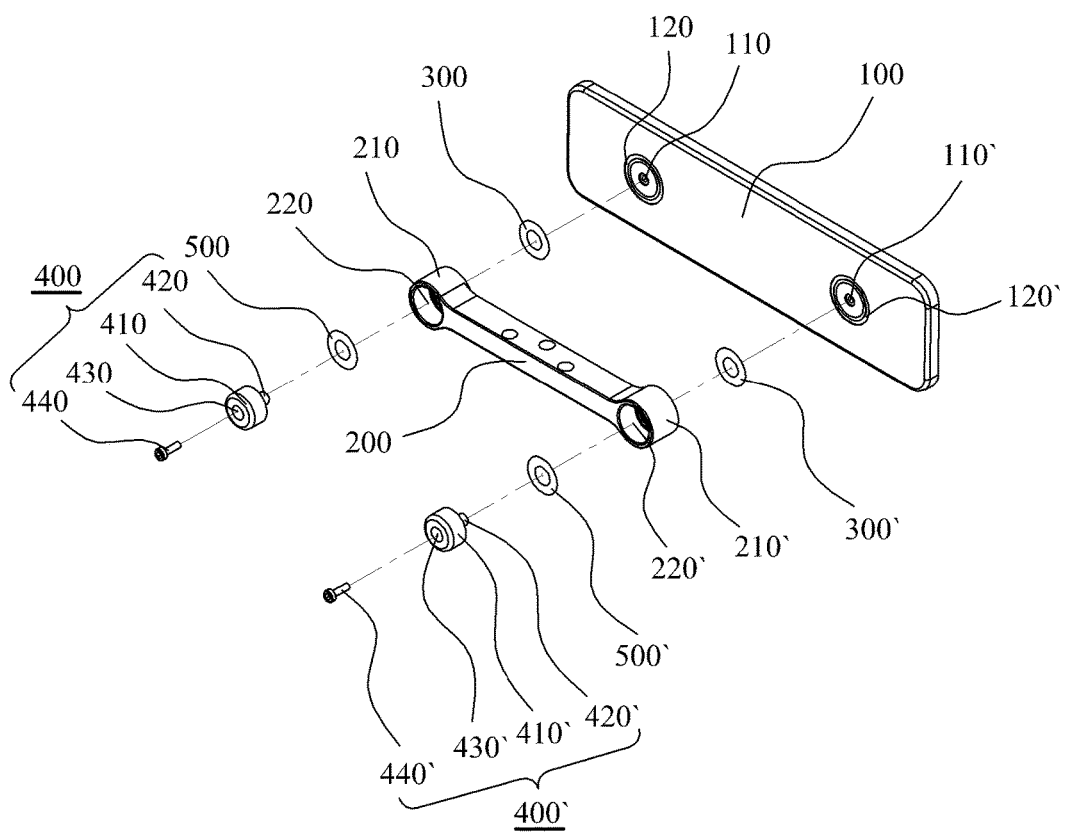
FIG. 3 is an exploded perspective view illustrating a disassembled state of a blade for a vacuum valve in accordance with a preferred exemplary embodiment of the present invention.

As illustrated in FIG. 3, the screw coupling parts 110 and 110' are kinds of connectors, which are symmetrically provided to be recessed in one surface of the opening/closing plate 100, and functions to connect the opening/closing plate 100 and the shaft connecting bar 200 to be described later by being coupled by means of coupling bolts 440 and 440' in connecting units 400 and 400' to be described later.

Figure 5:
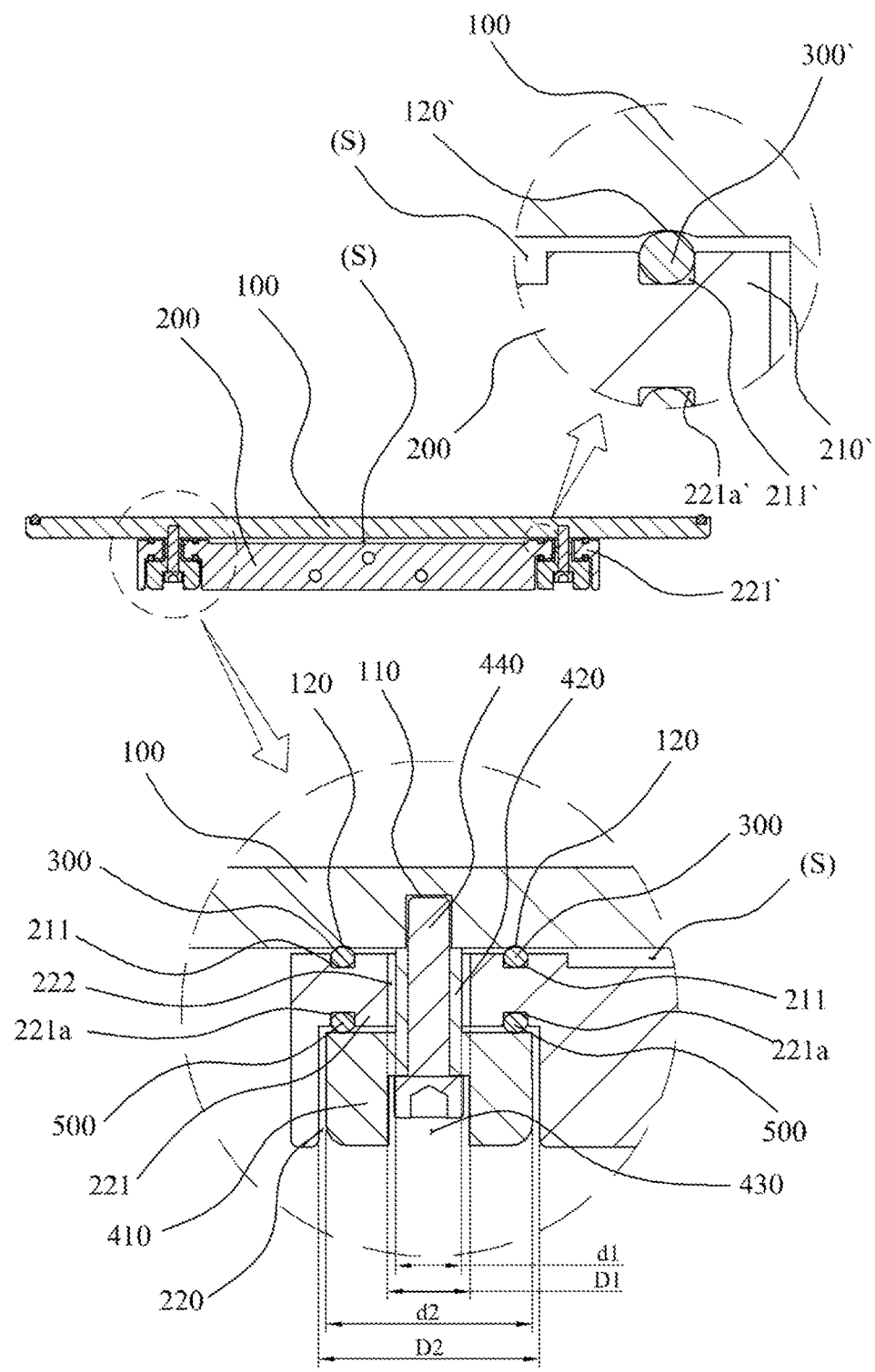
FIG. 5 is a cross-sectional view taken along line A-A of FIG. 4.

As illustrated in FIG. 3 or 5, the first elastic member seating parts 120 and 120' are the components, which are respectively provided to be recessed around the screw coupling parts 110 and 110', and function to prevent first elastic members 300 and 300' from being detached outward and enable maintenance of original positions of the first elastic members 300 and 300', in the case where one sides of the first elastic members 300 and 300', which are made of an elastic material and inserted between the one surface of the opening/closing plate 100 and one sides of contact protrusion parts 210 and 210' to be described later, are seated on the first elastic member seating parts 120 and 120' while the opening/closing plate 100 and the shaft connecting bar 200 are connected, so that the shaft connecting bar 200 is moved in the closing direction C by the operation of the driving member 30 and the first elastic members 300 and 300' are compressed.

Next, the shaft connecting bar 200 will be described. As illustrated in FIG. 1 or 2, the shaft connecting bar 200 is the component, which is provided in the one surface of the opening/closing plate 100, is coupled to a main shaft 20 and guide shafts 21, and vertically or horizontally moves the opening/closing plate 100 through the main shaft 20 and the guide shafts 21 which are vertically or horizontally moved by the operation of the driving member 30. The shaft connecting bar 200 includes contact protrusion parts 210 and 210' and connecting parts 220 and 220'.

As illustrated in FIG. 3 or 5, the contact protrusion parts 210 and 210' are the components, which are provided to protrude on both sides of the shaft connecting bar 200 and connected to the one surface of the opening/closing plate 100, and second elastic member seating parts 211 and 211', which correspond to the first elastic member seating parts 120 and 120', are respectively provided to be recessed in one side surfaces the contact protrusion parts 210 and 210'.

Accordingly, while the opening/closing plate 100 and the shaft connecting bar 200 are connected, the other sides of the first elastic member seating parts 120 and 120', which have the one sides seated on the first elastic member seating parts 120 and 120', are seated on the second elastic member seating parts 211 and 211', and thus, the second elastic member seating parts 211 and 211' together with the first elastic member seating parts 120 and 120' function to prevent the first elastic members 300 and 300' from being detached outward and enable maintenance of the positions of the first elastic members 300 and 300'.

Figure 4:
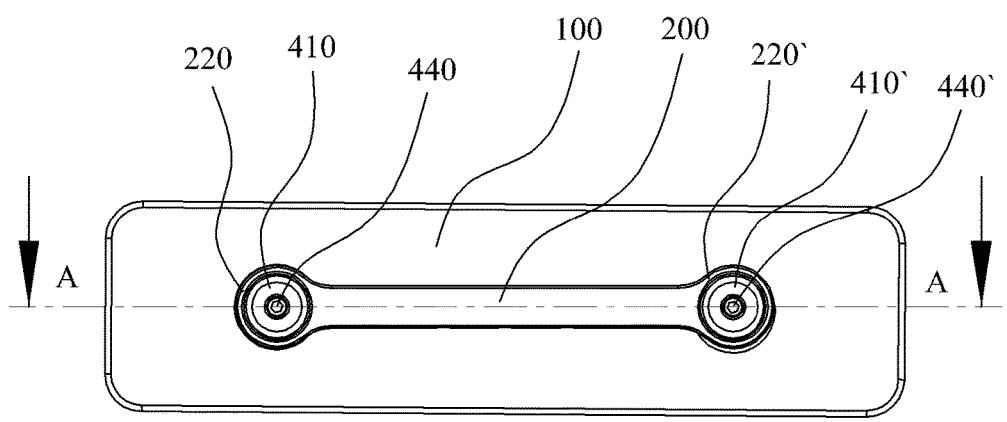
FIG. 4 is a front view illustrating another side of a blade for a vacuum valve in accordance with a preferred exemplary embodiment of the present invention.

As illustrated in FIG. 3 or 4, the connecting parts 220 and 220' are the components, which are provided as holes inside the contact protrusion parts 210 and 210' such that connecting units 400 and 400' to be described later are inserted therein, and which enables coupling protrusions 440 and 440' of the connecting units 400 and 400' to be coupled to the screw coupling parts 110 and 110'. The connecting parts 220 and 220' include stepped parts 221 and 221', third elastic member seating parts 221a and 221a', and connection inserting holes 222 and 222'.

The stepped parts 221 and 221' are the components which protrude on inner side surfaces of the connecting parts 220 and 220', and function to support head parts 410 and 410' of the connecting units 400 and 400' to be described later.

Meanwhile, in the stepped parts 221 and 221', third elastic member seating parts 221a and 221a' may be provided to be recessed such that one sides of the second elastic members 500 and 500', which are made of an elastic material and inserted between the stepped parts 221 and 221' and the head parts 410 and 410', are seated thereon.

As illustrated in FIG. 5, the connection inserting holes 222 and 222' are the components, which are provided as holes in the stepped parts 221 and 221', and enables the opening/closing plate 100 and the shaft connecting bar 200 to be connected in such a manner that the connecting protrusion parts 420 and 420' of the connecting units 400 and 400' are respectively inserted in the connection inserting holes 222 and 222'.

Meanwhile, in the present invention, the diameters D1 of the connection inserting holes 222 and 222' is characterized by being provided greater than the diameter d1 of the connecting protrusion parts 420 and 420'.

Figure 6:
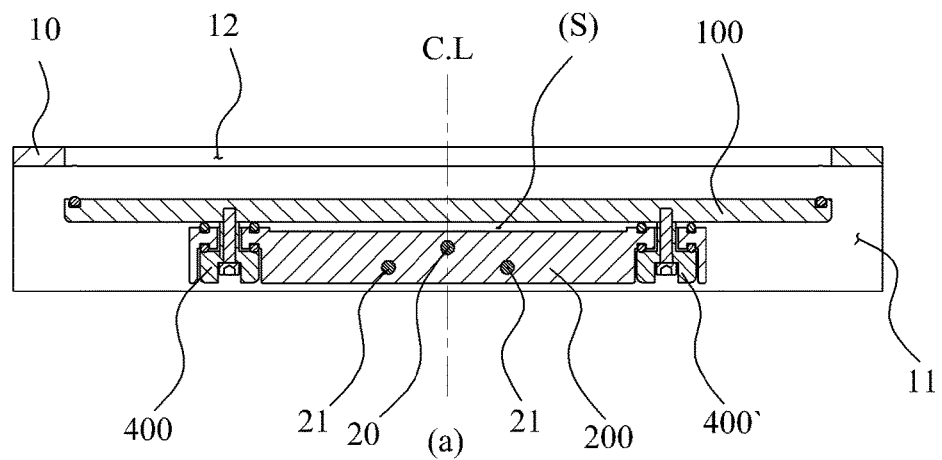
FIG. 6 is a view of an example illustrating a state in which a blade for a vacuum valve closes a moving passage in accordance with a preferred exemplary embodiment of the present invention.
Figure 6:
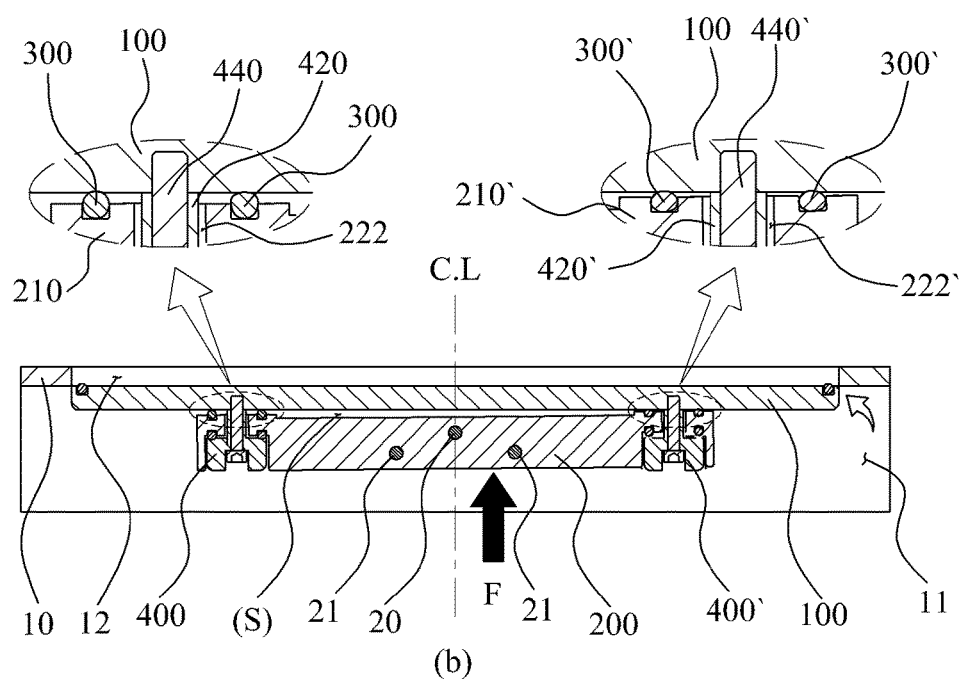

This is, as illustrated (b) of FIG. 6, for ensuring a displacement range so that the shaft connecting bar 200 may rotate counterclockwise without being restricted by the connecting protrusion parts 420 and 420' inserted in the connection inserting holes 222 and 222', in the case in which: for example, during the driving member 30 operates, when a force F transmitted to the shaft connecting bar 200 is further applied to the right side (with respect to FIG. 6) from the center line C.L of the shaft connecting bar 200, and at the moment the opening/closing plate 100 thereby comes into close contact with the moving passage part 12, the first elastic member 300' on the right side is further deformed than the first elastic member 300 on the left side (with respect to FIG. 6), and thus, the shaft connecting bar 200 rotates counterclockwise.

Next, the connecting units 400 and 400' will be described. As illustrated in FIG. 3 or 5, the connecting units 400 and 400' are the components, which are respectively inserted in the connecting parts 220 and 220' and connected to the one surface of the opening/closing plate 100, thus functioning to connect the opening/closing plate 100 and the shaft connecting bar 200. The connecting units 400 and 400' include head parts 410 and 410', the connecting protrusion parts 420 and 420', coupling parts 430 and 430', and coupling bolts 440 and 440'.

The head parts 410 and 410' are the components, which come into contact with the other sides of the second elastic members 500 and 500' seated on the third elastic member seating parts 221a and 221a' of the stepped parts 221 and 221' while the connecting unit 400 and 400' are inserted in the connecting parts 220 and 220'. The head parts 410 and 410' are provided on the other side of the connecting protrusions 420 and 420' which are fixed to the one surface of the opening/closing plate 100, thereby functioning to restrict the movement of the shaft connecting bar 200.

Meanwhile, in the present invention, the inner diameter D2 of the connecting parts 220 and 220', on which the head parts 410 and 410' are mounted, is characterized by being provided greater than the diameter d2 of the head parts 410 and 410'.

This is, as illustrated above with reference to (b) of FIG. 6, for ensuring a displacement range so that the shaft connecting bar 200 may rotate counterclockwise, when a force F transmitted to the shaft connecting bar 200 is further applied to the right side (with respect to FIG. 6) from the center line C.L of the shaft connecting bar 200.

The connecting protrusion parts 420 and 420' are the components, which are provided to protrude on one sides of the head parts 410 and 410', pass through the connection inserting holes 222 and 222', and are connected to the one surface of the opening/closing plate 100. The connecting protrusion parts 420 and 420' function to fix the head parts 410 and 410'.

The coupling parts 430 and 430' are the components, which are provided as holes inside the head parts 410 and 410' and the connecting protrusion parts 420 and 420', and enables the coupling bolts 440 and 440' to be coupled to the screw coupling parts 110 and 1110' by being inserted thereinto.

Hereinafter with reference to FIGS. 1 and 6, the process in which the opening/closing plate 100 closes the moving passage part 12 will be described in accordance with a preferred exemplary embodiment of the present invention.

First, as illustrated in (a) of FIG. 6, the opening/closing plate 100 is located on the side of the opening direction O from the moving passage part 12 and maintains an open state of the moving passage part 12.

Subsequently, the operation for closing the moving passage part 12 is generally performed such that the opening/closing plate 100 and the shaft connecting bar 200 are vertically moved by the driving member 30 and then horizontally moved in the closing direction C, and thus, the moving passage part 12 is sealed and closed by the opening/closing plate 100.

However, when the opening/closing plate 100 and the shaft connecting bar 200, which have been vertically moved, are horizontally moved in the next step, for example, as illustrated in (b) of FIG. 6, the opening/closing plate 100 is horizontally moved while being distorted to one side during the process of closing the moving passage part 12 when a force F transmitted to the shaft connecting bar 200 is further applied to the right side (expressed with respect to FIG. 6) from the center line C.L of the shaft connecting bar 200.

In this case, when the front surface of the opening/closing plate 100 contacts the moving passage part 12, as the first elastic member 300' on the right side is further deformed than the first elastic member 300 on the left side (expressed with respect to FIG. 6) in proportion to the force F and a distance, the opening/closing plate 100 and the moving passage part 12 may be in parallel with each other, so that the opening/closing plate 100 and the moving passage part 12 maintain a tight connection state without a clearance and may thereby be precisely sealed.

Meanwhile, various numbers of connecting protrusion parts 220 and 220' of the shaft connecting bar 200 and the first elastic members 300 and 300' may be provided in consideration of shapes and sizes of components, such as a vacuum pump or a blade, or an output of the driving member 30.

So far, optimal examples have been described in the specification with reference to drawings. Specific terms are used herein, but these terms are merely used to describe the present invention and should not be construed as restricting meanings thereof or the scope of the present invention set forth in claims below. Therefore, those skilled in the art could understand that various modifications and equivalent examples can be made therefrom. Thus, the actual technical scope of the present invention should be determined according to the technical concept of the accompanying claims.

The invention claimed is:

1. A blade (1) for vacuum valves, which is provided in a moving space (11) in a valve housing (10) and opens/closes a moving passage part (12) depending on whether to operate a driving member (30), the blade (1) for vacuum valves comprising:
an opening/closing plate (100) formed in a plate shape and having one side surface contacting the moving passage part (12), screw coupling parts (110, 110') formed on the other side surface, and first elastic member seating parts (120, 120') provided around the screw coupling parts (110, 110') so as to allow the one sides of first elastic members (300, 300') to be seated thereon;
a shaft connecting bar (200) provided on the other side surface of the opening/closing plate (100), and having one or more contact protrusion parts (210, 210') having second elastic member seating parts (211, 211') provided to allow the other sides of the first elastic members (300, 300') to be seated thereon; and
connecting units (400, 400') coupled to the shaft connecting bar (200) and connected to the other surface of the opening/closing plate (100), wherein
the first elastic members (300, 300') are respectively provided between the first elastic member seating parts (120, 120') and the second elastic member seating parts (211, 211') and guiding the opening/closing plate (100) and the shaft connecting bar (200) to be elastically connected,
the connecting units (400, 400') are inserted into connecting parts (220, 220') and connected to the other surface of the opening/closing plate (100);
wherein the connecting units (400, 400') are provided with: head parts (410, 410') having shapes of screw heads;
connecting protrusion parts (420, 420') providing on one sides of the head parts (410, 410') and connected to the other surface of the opening/closing plate (100);
coupling parts (430, 430') provided inside the head parts (410, 410') and the connecting protrusion parts (420, 420') so that coupling bolts (440, 440') are inserted thereinto, the coupling bolts (440, 440') being coupled to the screw coupling parts (110, 110') while being inserted into the coupling parts (430, 430') and thereby connecting the opening/closing plate (100) and the shaft connecting bar (200);
stepped parts (221, 221') provided on a inner side surfaces of the coupling parts (220, 220') so that the head parts (410, 410') are supported thereby while the connecting units (400, 400') are inserted into the connecting parts (220, 220'); and
connection inserting holes (222, 222') provided inside the stepped parts (221, 221') so that the connecting protrusion parts (420, 420') are inserted thereinto.

2. The blade (1) for vacuum valve of claim 1, wherein a diameter D1 of the connection inserting holes (222, 222') are provided greater than a diameter d1 of the connecting protrusion parts (420, 420').

3. The blade (1) for vacuum valve of claim 2, wherein;
the stepped parts (221, 221') are provided with third elastic member seating parts (221a, 221a') so that one sides of the second elastic members (500, 500') are seated thereon, and
second elastic members (500, 500') are provided between the third elastic member seating parts (221a, 221a') and one side of the head parts (410, 410') so that the shaft connecting bar (200) and the connecting units (400, 400') are elastically connected.

* * * * *